BULK PACKAGE FOR CUT SIZE PAPER

Original Filed May 3, 1967

United States Patent Office

Re. 26,663
Reissued Sept. 9, 1969

26,663

BULK PACKAGE FOR CUT SIZE PAPER

Richard J. Dwyer, Jr., Bellbrook, Ohio, assignor to Kimberly-Clark Corporation, Neenah, Wis., a corporation of Delaware Original No. 3,367,487, dated Feb. 6, 1968, Ser. No. 635,738, May 3, 1967. Application for reissue May 22, 1968, Ser. No. 741,832

Int. Cl. B65d *79/00*

U.S. Cl. 206—57 8 Claims

Matter enclosed in heavy brackets [ ] appears in the original patent but forms no part of this reissue specification; matter printed in italics indicates the additions made by reissue.

ABSTRACT OF THE DISCLOSURE

A bulk package for a multiple-ream stack of cut size paper designed for use with copy making machines. The package is a paperboard carton of a size sufficient to hold several reams. The carton is encircled by a tear strip which when removed to open the carton, detaches a portion of the top and two side panels of the carton at one end to expose the top and sides of the paper stack at that end. A substantial portion of the bottom panel of the carton is retained to provide support for the stack. The opened carton containing the stack acts as a service tray which can be placed on the delivery platform of a copy making machine ready for use.

Background of the invention

This invention relates to an improved bulk package for cut size paper designed for use with copy making machines.

The present practice is to wrap individual 500 sheet reams of cut size paper in a protected paper overwrap. Several of these individually wrapped reams are then packed into an outer corrugated shipping container for shipment to customers. When made ready for use, the indivdual packages must be unwrapped and the contents of several packages stacked on the delivery platform of the copy making machine.

Modern copying machines turn out copies at an ever-increasing rate, thus require constant replenishment of the cut size paper used to supply the machine. Replacement of the cut size paper from individually wrapped 500 sheet reams is time-consuming and inefficient. An improved handling means obviously would be a step forward in the art.

The bulk package of this invention eliminates the individually wrapped ream and permits more efficient handling of the paper.

The package is in the form of a paperboard carton containing several reams of paper. The carton is designed, so that, after it is opened, a major portion of the carton remains with the cut size paper stack when it is placed on the machine. The opened carton acts as a service tray for handling the stack while maintaining the stack of sheets in aligned arrangement.

Summary of the invention

The improved bulk package of this invention comprises a heavy paperboard carton of a size sufficient to hold several reams of cut size paper. While the number of reams is optional, a carton large enough to hold a stack of six reams, or 3,000 sheets, is a preferred size.

The carton is provided with a circumferential tear strip which passes through the top panel, the two side panels, and the bottom panel of the carton. When the tear strip is torn off, the end panel at the front of the carton and portions of the top and side panels are removed to expose the corresponding top and sides of the sheet stack. The tear strip extends through the bottom panel in a manner to retain a major portion of the bottom panel underlying substantially the full length of the sheet stack. The unremoved portion of the carton comprising the side, top, and the rear end panel maintains the sheets in alignment, while the bottom panel provides support along substantially the entire length of the bottom of the stack. The opened carton containing the entire stack is placed on the delivery platform of a copy making machine with the open end facing the machine. The front and side edges of the sheets in the front portion of the stack are free of obstructions and are accessible to the sheet handling mechanism of the machine without further handling or adjustment.

It is therefore an object of this invention to provide a bulk package for cut size paper which may be easily opened and which, when opened, serves as a convenient service tray for handling the paper.

Another object is to provide a more economical package for cut size paper designed for use with copy making machines.

Still another object is to provide a bulk package for cut size paper which serves as a shipping carton and which converts to a service tray for the paper after being opened.

Other objects and advantages will become apparent to those skilled in the art from the following specification and attached drawing.

Figure 1:
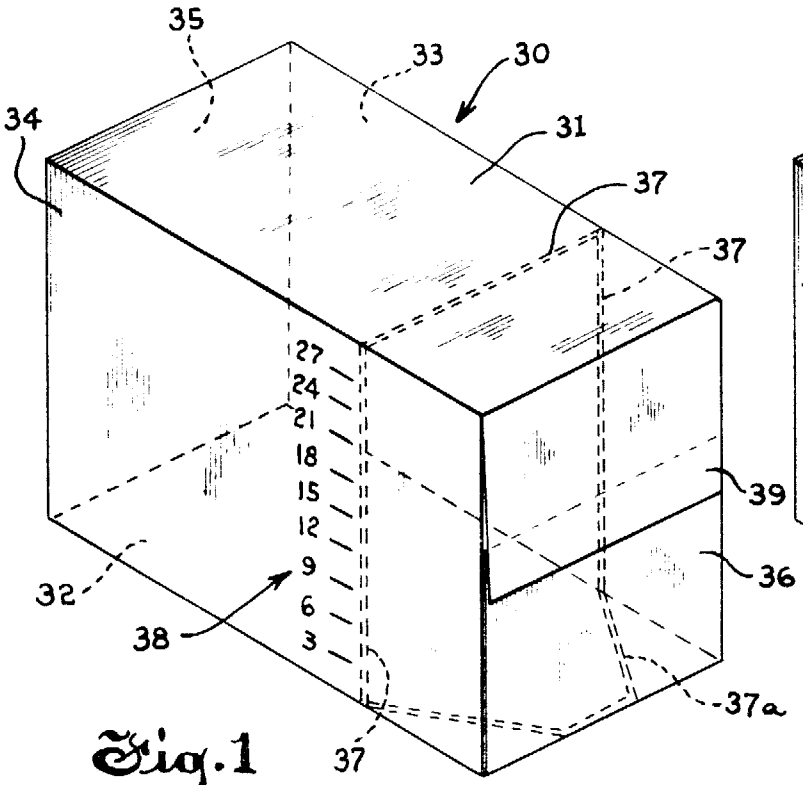
FIGURE 1 is a perspective view of one embodiment of a bulk package carton having a removable tear strip arranged in accordance with the invention.

The package of FIG. 1 comprises a rectangular carton 30 of heavy paperboard containing several reams of cut size paper. The carton 30 comprises a top panel 31, a bottom panel 32, side panels 33 and 34, rear end panel 35, and front end panel 36. The usual overlapping flaps 35 which seal the carton are preferably part of the end panels to provide additional reinforcement.

A tear strip 37 and 37a encircles the carton, passing through the top, bottom and side panels. Portion 37 of the tear strip is preferably space several inches back from front panel 36, extending up side panel 34, over top panel 31, and down side panel 33 where it joins tear strip extension 37a. Tear strip extension 37a, as a continuation of strip 37, extends diagonally from the bottom of side panel 33 to a point short of the centerline of front panel 36, past the centerline of front panel 36, and then diagonally back to tear strip 37 at the bottom of side panel 34. A graduated scale, as shown at 38, may be printed on one or both side panels adjacent the tear strip on those portions of the carton which remain after the tear strip is removed, to indicate approximately how many sheets remain in the carton during use.

Figure 2:
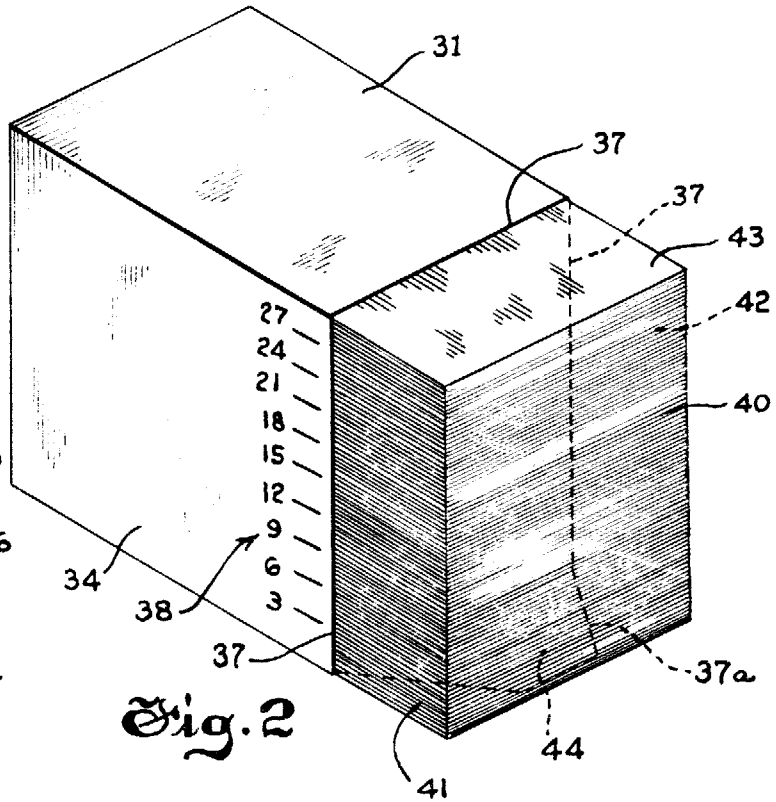
FIGURE 2 is a perspective view similar to FIG. 1, in which the tear strip and the front end of the carton have been removed.

In FIG. 2, the tear strip and end portions of the carton have been removed exposing the front end of the stack cut size sheets 40. Side edges 41 and 42 of the sheets in the stack, and the surface of top sheet 43 are exposed, so that all edges are unobstructed and become accessible to the sheet handling mechanism of the copy making machine after the opened carton containing the sheet stack is placed on the delivery platform of the machine.

The tongue-like central section 44 of the bottom panel, which remains after the carton is opened, provides support for the front portion of sheet stack 40.

Description of the preferred embodiment

As shown in the drawings, the improved bulk package of this invention comprises a heavy paperboard carton 30 of a size sufficient to hold multiple reams of cut size paper 40. In the preferred embodiment the carton contains six reams, or 3,000 sheets. The number of sheets and size of carton being optional depending on the preference of a customer or user.

For a package of 3,000 sheets of 20# basis weight, 8½" x 11" paper, the appropriate outer dimensions of the carton are about 8¾" wide, 11¼" long and 11¼" high, i.e., of a size sufficient to hold the stack of sheets snugly enough to prevent undesirable shifting. For different sizes and numbers of sheets the dimensions will vary accordingly.

The carton stock should be strong enough to permit shipment without damage, and preferably is of flame-retardant and moisture-proof construction to protect the contents.

The carton 40 is provided with a manually removable circumferential tear strip 37 and 37a which may consist of either a pair of spaced perforated lines as shown; a conventional tear tape; a heavy cord; or other means suitable for the intended purpose. The tear strip 37, on the top and two side panels of the carton, preferably is spaced several inches back from the front end of the carton. In the preferred embodiment as shown, this distance is about four inches. It is also preferred that the tear strip in the top and side panels, be disposed in parallel alignment with the ends of the carton, although various other arrangements may be used. For example, when it is desirable to expose a larger portion of the top sheet as required by certain machines, the tear strip in the top panel may extend rearwardly so that most, or all, of the top panel can also be removed.

In the embodiment shown, the tear strip starts at the bottom of one side panel 34, extends upwardly on said side panel for the full 11¼" height of the panel, passes crosswise over the top panel for its 8¾" width, then down the other side panel for its full 11¼" height.

In the bottom panel 32, the tear strip 37a then runs diagonally from its terminal point at the bottom of one side panel to the fornt edge of the bottom panel at a point short of its center, continues along a central portion of the bottom panel substantially coextensive with the front edge of the front end panel and then runs diagonally back to meet the terminal point of the tear strip at the bottom of the first side panel. The width of the central portion of the bottom panel, as defined by the tear strip, at the point where it meets the front end of the stack is not critical. However, it should be of a width to provide support to the stack when the carton is opened. Preferably, it should not extend completely to the side edges since it is desirable for these edges to be free of obstructions.

The user opens the package by tearing the strip up one side, over the top, then down the other side, and across the bottom. The detachable front portion of the carton thus formed is then completely separated from the remainder of the package. The opened package then looks like the FIG. 2 illustration.

After the carton is opened and the front sections removed, the remaining portions of the side, top and back panels maintain the sheets in the stack in alignment, while the bottom panel provides support along substantially the entire length of the bottom of the stack, leaving free the side portions of the sheets located at the bottom near the front of the stack. The front and side edges of the sheets, from top to bottom of the stack, are therefore completely free of obstructions and accessible to the sheet handling mechanism of the copy making machine when the opened carton is placed onto the delivery platform of the machine. The central portion of the bottom panel which extends substantially to the front edge of the stack supports the exposed end of the stack to make it easy for the user to handle the opened package when placing it onto the platform.

It is important that, in the opened package, the bottom panel of the carton extend for substantially the complete length of the stack, especially along a major portion of its longitudinal centerline. This enables the stack to be easily transported and placed onto the delivery platform, using substantially the full length of the bottom panel for support. In addition to providing support for handling the open package, the full length of the remaining portion of the bottom panel is advantageous in that it maintains the stack of sheets at the same level, front and back, until the entire stack is exhausted.

From the drawing, it will be seen that one of the remaining side panels of the opened carton may be marked with a scale, or other indicia, along an edge of the tear strip line to enable the operator to determine the approximate number of sheets remaining in the stack when in use. Both remaining panels may be so marked, if desired.

In constructing the package, the usual overlapping flaps used to seal the carton are preferably located at the front and back ends to provide additional strength during shipment and handling.

The above-described carton is suitable for use with most copy making machines. Various changes may be made in the location of the tear strip to accommodate it to certain peculiarities of the machine with which it is to be used without departing from the spirit of the invention.

For example the tear strip may extend up the sides as shown, but then may angle back to the rear of the top panel to provide a larger area of access to the top sheets for handling by the delivery mechanism of a machine. Along the bottom panel, however, the tear strip should be arranged so that at least the central portion of the panel extends substantially to the front of the stack after opening.

It will be further apparent to those skilled in the art, that other suitable changes, modifications and variations may be made without departing from the spirit and scope of the invention [as defined in the appended claims].

What is claimed is:

1. A bulk package for multiple reams of cut size paper which comprises a rectangular paperboard carton and a multiple ream stack of cut size paper disposed therein; said carton having top and bottom panels, a first side panel, a second side panel, and front and rear end panels; said carton having a manually removable tear strip disposed near the front end thereof and arranged to encircle said carton circumferentially, starting at the bottom of said first side panel, extending to the top of said first side panel, across said top panel, down said second side panel, and across said bottom panel back to the starting point; said tear strip in said side and top panels being spaced at least several inches from said front end while in said bottom panel said tear strip extends to said front end and is coextensive therewith in at least a central portion thereof.

2. The package of claim 1 in which at least one side panel has indicia adjacent the edge of said tear strip opposite from said front end.

3. The package of claim 1 in which the tear strip in said side and top panels is disposed substantially in parallel alignment to the carton ends.

4. The package of claim 3 in which the tear strip in the bottom panel extends forward and diagonally inward from the bottom of the second side panel to a point short of the front centerline of said bottom panel, is substantially coextensive with a center portion of the front edge of said bottom panel and then extends diagonally backward to meet the starting point of the tear line at the bottom of the first side panel.

*5. A carton especially adapted for dual use as a shipping container and service tray for multiple reams of cut size paper comprising a rectangular paperboard carton having top and bottom panels, a first side panel, a second side panel, and front and rear end panels, said carton having a manually removable tear strip disposed near the front end thereof and arranged to encircle said carton circumferentially, starting at the bottom of said first side panel, extending to the top of said first side panel, across said top panel, down said second side panel, and across said bottom panel back to the starting point; said tear strip in said side and top panels being spaced at least several inches from said front end while in said bottom panel said tear strip extends to said front end and is coextensive therewith in at least a central portion thereof.*

*6. The carton of claim 5 in which at least one side panel has indicia adjacent the edge of said tear strip opposite from said front end.*

*7. The carton of claim 5 in which the tear strip in said side and top panels is disposed substantially in parallel alignment to the carton ends.*

*8. The carton of claim 7 in which the tear strip in the bottom panel extends forward and diagonally inward from the bottom of the second side panel to a point short of the front centerline of said bottom panel, is substantially coextensive with a center portion of the front edge of said bottom panel and then extends diagonally backward to meet the starting point of the tear line at the bottom of the first side panel.*

References Cited

The following references, cited by the Examiner, are of record in the patented file of this patent or the original patent.

UNITED STATES PATENTS

| | | | |
|---|---|---|---|
| 1,791,344 | 2/1931 | Bendheim | 229—7 |
| 1,864,968 | 5/1932 | Weiner | 229—51 |
| 2,170,230 | 8/1939 | Armstrong | 229—51 |
| 2,467,875 | 4/1949 | Andrews | 229—51 |
| 3,315,875 | 4/1967 | Praztorius | 206—56 |

WILLIAM T. DIXON, Jr., Primary Examiner